Feb. 16, 1971     E. H. W. ALLEN     3,563,085
LIQUID METER COUNTER
Filed July 18, 1968
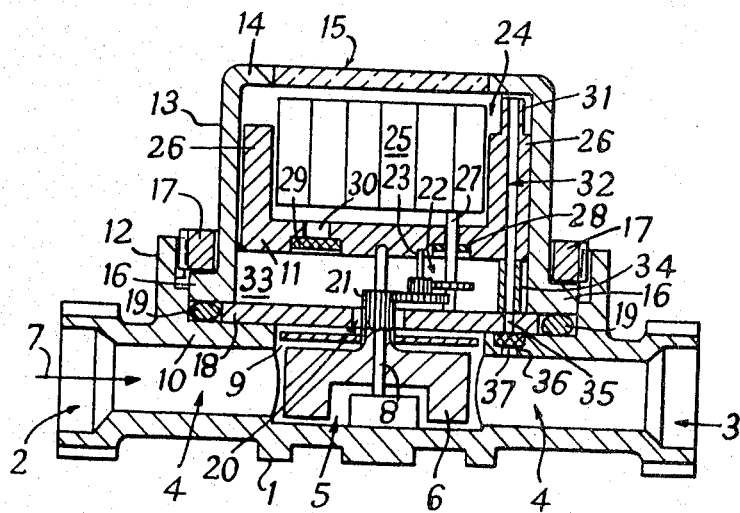
Inventor:
Eric H. W. Allen
By Baldwin Wight Miller & Brown
Attorneys

United States Patent Office 3,563,085
Patented Feb. 16, 1971

3,563,085
LIQUID METER COUNTER
Eric H. W. Allen, Stopsley, Luton, England, assignor to George Kent Limited, Luton, England a British company
Filed July 18, 1968, Ser. No. 745,875
Claims priority, application Great Britain, July 28, 1967, 34,747/67
Int. Cl. G01f 1/00
U.S. Cl. 73—273                                14 Claims

ABSTRACT OF THE DISCLOSURE

A liquid meter counter provided with means for completely filling a housing containing the counter element with liquid taken from the liquid being metered.

---

This invention relates to liquid meter counters.

Liquid meter counters can be either of the "wet" or "dry" type. The wet type has the counter completely exposed to the liquid being metered but difficulties occur due to foreign matter in suspension in the liquid settling out and obscuring the counter. A further difficulty is that air is trapped in the counter beneath the counter window and the resulting bubbles make a reading of the counter element difficult. Condensation can also occur which again interferes with reading the counter.

In the dry type a gland is provided which conveys movement to a counter element situated in a dry counter box. The gland can be either "packed" or magnetic but this configuration makes the meter more complicated and expensive.

In a third arrangement the counter element is arranged in a sealed liquid-filled transparent housing. The counter drive is again through a gland and a pressure equalising sac is filled. This type of counter requires a gland to retain the liquid during transit and filling is difficult and adds to the cost.

According to the present invention a liquid meter counter is provided with means for completely filling the housing containing a counter element with liquid taken from the liquid being metered.

Thus, the counter is of the "wet" type but the means for completely filling the housing ensure that condensation cannot occur and there are no bubbles beneath the counter window.

Preferably means are included for drawing off any air trapped in the counter housing during initial liquid filling and thus, means may be provided for connecting the upper part of the counter housing to a point of low fluid pressure in the meter with which the counter is to be used.

In a preferred arrangement the connecting means are provided by a capillary and at least part of the capillary is formed in a mounting the lower part of which forms the lower wall of the counter housing.

With this arrangement the point of lower fluid pressure is preferably located in the meter outlet port.

In any case, means may be induced for filtering the liquid entering the housing to eliminate foreign matter in suspension in the liquid which might settle out and obscure the counter.

In a convenient construction the drive to the counter enters the counter housing through a spindle provided with a filter gland although the main liquid access to the counter housing is preferably through an opening provided with a filter pad. The connecting means between the upper part of the counter housing and the point of low fluid pressure in the meter is also preferably provided with a filter and any or all of these filters may be made from a porous plastics material.

If required the filter in the connecting means could be replaced by a simple no-return valve which would act to stop back flow of unifiltered liquid.

In one preferred form of the invention is adapted for use with a single jet inferential meter and in this arrangement the liquid is preferably withdrawn from the meter measuring chamber to the counter housing.

The invention also includes a liquid meter counter as set forth above in combination with a liquid meter.

The invention may be performed in many ways but one embodiment of a liquid meter counter housing embodying the invention and applied to a single jet inferential meter will now be described by way of example and with reference to the accompanying drawing which shows a cross sectional view of the construction.

As shown in the drawing the single jet inferential meter comprises an outer casing 1 formed with inlet and outlet ports 2 and 3 which lead to a liquid flow passage 4. This liquid flow passage 4 extends across the casing 1 from side to the other and at mid-point the passage is enlarged to one side to provide a semi-circular measuring chamber 5 in which a rotor 6 rotates. Such a meter is described in the applicants co-pending British patent application No. 34,746/67.

Liquid enters the meter in the direction of the arrow 7 through the inlet port 2 which is circular and on entering the semi-circular measuring chamber 5 the throughway area is considerably increased resulting in a lower fluid velocity. This reduction in velocity results in an increase in the fluid static pressure as defined according to Bernoullis Theorem. As the flow enters the outlet port 3 from the measuring chamber 5 the fluid velocity increases and the static fluid pressure is thus reduced.

A rotor spindle 8 extends upwards from the rotor 6 and passes through an opening 9 in the upper wall 10 of the measuring chamber 5 to a bearing carried by a mounting 11, to be described. The upper side 10 of the meter casing 1 in which the opening 9 is provided is formed with a large diameter boss 12 having a large diameter inner bore which is screw threaded for a short distance. This boss 12 provides a location for a counter box 13 which is to be used with the meter. The counter box 13 is itself in the form of a cup-shaped housing 14, the bottom of the cup being provided with a window 15 and the upper periphery of the cup being formed with an outwardly directed flange 16. The housing 14 is mounted in an inverted position in the large diameter bore in the boss 12 and is held down by a co-operating retaining ring 17 screwed into the inner bore and bearing against one side of the flange 16. The other side of the flange 16 bears against a circular plate 18 which extends across the outer surface of the upper wall 10 of the measuring chamber 5 and thus holds this plate in position. A sealing ring 19 surrounds the plate and is also held in position by the out-turned flange 16 and the centre of the circular plate 18 is provided with a circular opening 20 through which the rotor spindle 8 projects. The circular opening 20 is of larger diameter than the spindle 8 so that there is a clearance all around it and the rotor 6 is provided with an axial extension which is formed as a gear wheel 21 and which can mesh with appropriate gearing 22 to provide the necessary drive to the counter. The gearing 22 is carried on spindles 23 one end of each of the spindles being journalled in the circular plate 18 and the other end being mounted in bearings carried in the mounting 11 referred to above. This mounting 11 which is located within the cup-shaped counter housing 14 extends across the housing to provide a base to a counter chamber 24 within which the counter element 25 is driven by appropriate mechanism (not shown) is housed. Thus, the counter housing 14 is provided into two, the lower part communicating freely with the measuring chamber 5 through the clearance around the rotor spindle 8 and the upper part being closed and carrying the counter element 25 which is supported in upwardly extending portions 26 of the mounting 11.

The drive from the gearing referred to passes into the closed chamber through a spindle 27 which is fitted with a filter gland 28. This gland 28 does not need to seal and it can pass liquid provided it filters it as required. The main liquid access to the counter chamber 24 is through a filter pad 29 which is provided in a bore 30 formed in the lower wall provided by the mounting 11. The filter pad 29 is made of porous plastics material and filters down to a very low micron level.

The mounting 11 is also formed with an upwardly extended portion 31 which extends to the highest possible point in the counter chamber 24 and a capillary passage 32 is provided as a boring extending through this extension from the highest point and vertically down it to emerge into the space 33 above the circular plate 18. From here a small tube 34 is provided which continues the capillary passage down to the circular plate 18 which is formed with a suitable bore 35 as is the wall of the casing at the base of the large diameter bore in the boss 12 and 36. The capillary passage 32 thus formed is positioned in relation to the meter 50 that this bore 36 enters the outlet port 3 and part of the bore 36 is enlarged to locate a filter pad 37 which is again of porous plastics material.

On installation, and the first passage of liquid into the meter, the counter housing 14 will commence to fill with filtered liquid but air will be trapped in the upper parts. As the capillary leads 36 from the highest point in the counter chamber 25 to the meter outlet port 3 a siphonary action will occur through the capillary during flow conditions since the static pressure of the liquid entering the counter chamber 25 is higher than at the point where the capillary 36 enters the outlet port 3. Thus, the air trapped in the upper part of the counter chamber 25 will be siphoned off and the counter housing 14 will be completely filled with liquid, the portion in the actual counter chamber 25 having been filtered.

The filter pad 37 fitted to the lower end of the capillary is provided because during "start up" conditions the turbulence sometimes cause an initial "back flow" to occur in the capillary 36 and the filter will, of course, prevent foreign matter entering the counter chamber.

During flow conditions liquid will tend to flow through the filter 29 and the counter chamber 25 and back through the capillary 36 but most liquids contain small particles which, in practice, have been found ultimately to block the main filter 29 to the counter chamber 25 so that flow is either very much reduced or completely stops leaving the counter filled with a static filtered clean liquid.

In an alternative arrangement (not shown) the filter pad 37 at the lower end of the capillary 36 could be replaced by a simple non-return valve which will perform the same basic function, that is, to stop the back flow of unfiltered liquid.

I claim:
1. A liquid meter counter comprising a housing defining a liquid chamber, means for conducting liquid into said chamber, counter element means within said housing responsive to liquid flow, and means for siphoning air from an uppermost portion of said housing whereby the latter is substantially entirely filled with liquid conducted into said chamber by said liquid conducting means.

2. The liquid meter counter as defined in claim 1 wherein the liquid in said liquid chamber is at a predetermined pressure, means for establishing a zone of fluid pressure below said predetermined pressure, and said siphoning means being in liquid communication with said lower fluid pressure zone.

3. The liquid meter counter as defined in claim 1 wherein said liquid chamber has a top wall, and said siphoning means has an orifice opening into said liquid chamber contiguous said top wall.

4. The liquid meter counter as defined in claim 1 wherein said housing includes a bottom wall, and said siphoning means is in part defined by a passage in said bottom wall.

5. The liquid meter counter as defined in claim 1 including a liquid inlet port and a liquid outlet port, and said siphoning means is in liquid communication with said outlet port.

6. The liquid meter as defined in claim 1 including means for filtering liquid prior to being introduced into said liquid chamber.

7. The liquid meter is defined in claim 1 including drive means responsive to liquid flow for actuating said counter element means, said drive means including a spindle projecting into said liquid chamber through an opening in said housing, and means in the form of a filter closing said opening.

8. The liquid meter as defined in claim 1 including means for preventing back flow of liquid from said siphoning means into said liquid chamber.

9. The liquid meter counter as defined in claim 2 wherein said liquid chamber has a top wall, and said siphoning means has an orifice opening into said liquid chamber contiguous said top wall.

10. The liquid meter counter as defined in claim 2 wherein said housing includes a bottom wall, and said siphoning means is in part defined by a passage in said bottom wall.

11. The liquid meter counter as defined in claim 2 including a liquid inlet port and a liquid outlet port, and said siphoning means is in liquid communication with said outlet port.

12. The liquid meter counter as defined in claim 9 wherein said housing includes a bottom wall, and said siphoning means is in part defined by a passage in said bottom wall.

13. The liquid meter counter as defined in claim 9 including a liquid inlet port and a liquid outlet port, and said siphoning means is in liquid communication with said outlet port.

14. The liquid meter as defined in claim 13 including means for filtering liquid prior to being introduced into said liquid chamber.

References Cited

UNITED STATES PATENTS

| | | | |
|---|---|---|---|
| 769,351 | 9/1909 | Lohse | 73—229X |

FOREIGN PATENTS

| | | | |
|---|---|---|---|
| 213,629 | 2/1961 | Austria | 73—229 |
| 164,975 | 1/1964 | U.S.S.R. | 73—229 |

RICHARD C. QUEISSER, Primary Examiner

J. K. LUNSFORD, Assistant Examiner

U.S. Cl. X.R.

73—229